US009805319B2

(12) United States Patent
Beno et al.

(10) Patent No.: US 9,805,319 B2
(45) Date of Patent: Oct. 31, 2017

(54) APPLICATION OF BUSINESS PROCESS MANAGEMENT STANDARDS FOR DYNAMIC INFORMATION TECHNOLOGY MANAGEMENT

(71) Applicant: BMC Software, Inc., Houston, TX (US)

(72) Inventors: Tal Beno, Thornhill (CA); Steve Wong, Markham (CA); Artemios Tavoularis, Whitby (CA)

(73) Assignee: BMC Software, Inc., Houston, TX (US)

(*) Notice: Subject to any disclaimer, the term of this patent is extended or adjusted under 35 U.S.C. 154(b) by 76 days.

(21) Appl. No.: 13/631,328

(22) Filed: Sep. 28, 2012

(65) Prior Publication Data

US 2014/0096109 A1    Apr. 3, 2014

(51) Int. Cl.
*G06F 9/44*        (2006.01)
*G06Q 10/06*     (2012.01)

(52) U.S. Cl.
CPC ............... *G06Q 10/06* (2013.01); *G06F 8/20* (2013.01); *G06F 8/70* (2013.01)

(58) Field of Classification Search
None
See application file for complete search history.

(56) References Cited

U.S. PATENT DOCUMENTS

| | | | |
|---|---|---|---|
| 5,884,046 A * | 3/1999 | Antonov | 709/238 |
| 7,814,500 B2 * | 10/2010 | Weber | 719/314 |
| 8,521,570 B2 * | 8/2013 | Sadiq | 705/7.11 |
| 8,539,087 B2 * | 9/2013 | Gawali et al. | 709/229 |
| 8,561,080 B2 * | 10/2013 | Balko | 719/312 |
| 8,615,601 B2 * | 12/2013 | Patrick et al. | 709/238 |
| 2002/0104067 A1 * | 8/2002 | Green | G06F 8/24 717/101 |
| 2002/0112048 A1 * | 8/2002 | Gruyer | G06Q 30/02 709/224 |
| 2005/0091647 A1 * | 4/2005 | McCollum | G06F 8/20 717/130 |
| 2006/0106626 A1 * | 5/2006 | Jeng | G06Q 10/06 717/106 |
| 2007/0061191 A1 * | 3/2007 | Mehrotra | G06Q 10/06 705/7.36 |
| 2009/0187889 A1 * | 7/2009 | Kuester | G06F 8/10 717/125 |
| 2011/0078625 A1 * | 3/2011 | Mumford | G06F 9/4443 715/804 |
| 2012/0078809 A1 * | 3/2012 | Day | G06Q 10/067 705/348 |

(Continued)

Primary Examiner — Insun Kang
(74) Attorney, Agent, or Firm — Brake Hughes Bellermann LLP

(57) ABSTRACT

Processes and integrations include a method for managing a business process application development lifecycle. The method includes initiating, in a planning stage, requirements for an application based on adding new features to the application or a new application, implementing, in a development stage, a service process node (SPN) as a business process, and managing, in an operations stage, software code representing the application in a production environment. The SPN is configured to encapsulate at least one business service object and generate an interface configured to expose internal processes of the at least one business service object.

17 Claims, 6 Drawing Sheets

(56) References Cited

U.S. PATENT DOCUMENTS

| | | | |
|---|---|---|---|
| 2013/0239126 A1* | 9/2013 | Sun .................. | G06F 9/542 719/318 |
| 2013/0318492 A1* | 11/2013 | Satyanarayanan ........ | G06F 8/70 717/104 |
| 2014/0025426 A1* | 1/2014 | Doehring ............... | G06Q 10/06 705/7.27 |

* cited by examiner

APPLICATION OF BUSINESS PROCESS MANAGEMENT STANDARDS FOR DYNAMIC INFORMATION TECHNOLOGY MANAGEMENT

BACKGROUND

Field

Embodiments relate to using business process management (BPM) tools in information technology processes.

Related Art

Bridging information technology service management (ITSM) processes to Service Operations products has traditionally been a point to point integration. As a result, integrating support processes with automation tools has proven to be cumbersome. Moreover, as more products are acquired and added into a business service management (BSM) eco-system, standards for connecting the products into the core ITSM process are needed. Known visual tools lack a holistic governance and view into the BSM process spanning over several product lines and disciplines. The known visual tools are often disjointed with separate tools for the support side (e.g., information technology infrastructure library (ITIL) and task management workflows) and the automation side (e.g., run books automation/orchestrators).

While BPM is growing rapidly, known ITSM and BSM products poorly link IT management as a BPM discipline suited for the business roles in the IT organization. Known IT management solutions leverage a host of different tools and languages yet none standardize around BPM. Known ITSM products tend to implement their IT management practices with limited flexibility and personalization.

Moreover, development operations (DevOps) is growing as a prominent discipline in BSM. DevOps is talking about the need to bridge the gap between development and testing/QA teams and the operations roles which are responsible for the production environments. As is known, there is a lack of coordination, synchronization and governance around the application life cycle due to missing a standard methodology for articulating an application business process between a product manager that initiates a change, a new feature or a whole new application, to the development team which implements it to the production environment where this application will be deployed eventually and be continuously monitored. This is particularly missing with ITSM products where the process is the essence of the application delivered to the users.

SUMMARY

One embodiment includes a method for managing a business process application development lifecycle. The method includes initiating, in a planning stage, requirements for an application based on adding new features to the application or a new application, implementing, in a development stage, a service process node (SPN) as a business process, and managing, in an operations stage, software code representing the application in a production environment.

Another embodiment includes a non-transitory computer readable medium. The non-transitory computer readable medium including code segments that when executed by a processor cause the processor to implement a service process node (SPN). The SPN is configured to encapsulate at least one business service object and generate an interface configured to expose internal processes of the at least one business service object.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
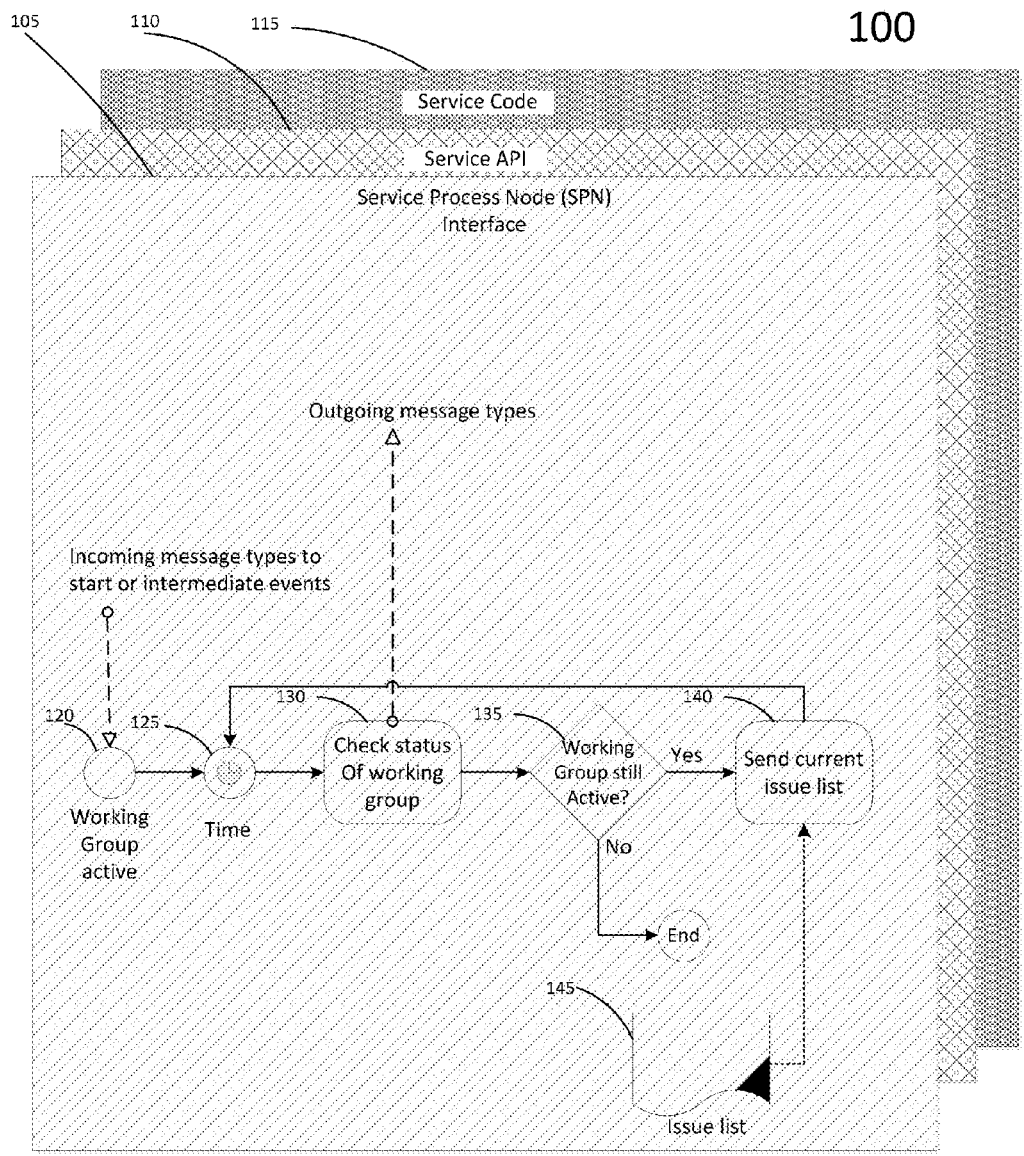
FIG. 1 illustrates a service process node according to an example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Business Process Model and Notation (BPMN) is a graphical representation for specifying business processes in a business process model. Example embodiments describe a graphical BPMN standard based environment that spans the process from support to automation, model and track service management processes end to end through to automation services. This standards based hub approach may allow for an open solution that may improve integration of products into the BSM eco-system. Example embodiments may provide a standard methodology to supplement and add to the core ITSM process.

The graphical BPMN tool may span over the holistic IT management process and may enable governance and transparency both through the connection points between the solutions as well as within the products themselves.

Example embodiments describe the IT management and ITIL best practices as a BPM discipline, suited for the business roles in the IT. Example embodiments may enable dynamic implementation and modification of IT management processes and best practices.

Example embodiments may be implemented as a layer on top of an active objects (AO) application programming interface (API). Example embodiments describe a BPMN engine with a graphical representation of the ITSM release. In addition, example embodiments describe connection points in ITSM and other products across the BSM ecosystem (e.g., business resource planning model (BRPM)). In addition, the each process may expose its internal flows and connection points.

FIG. 1 illustrates a service process node (SPN) according to an example embodiment. ITSM and any other product that may integrate with the IT management process may expose at least one SPN. A SPN may encapsulate at least one business services or objects (business service object) and may expose using a BPMN (or alternatively business process execution language (BPEL)) description the internal flow/process of the business service. The process may include known hooks for other processes to connect to. In BPMN the hooks may be represented by events and messages. The SPN may also provide governance over the state of the process (e.g. parameters and a step that an instance is currently executing). Therefore, the SPN may provide a mapping of the underlying code to the exposed process in design-time as well as in run-time.

As shown in FIG. 1, the SPN 100 includes a SPN interface 105, a service API 110 and service code 115. The service API 110 and the service code 115 are known to those skilled in the art, and are shown for the sake of completeness. Therefore for the sake of brevity, the service API 110 and the service code 115 will not be discussed further.

The SPN interface 105 includes a business process. Example embodiments are not limited to the business process as shown. The business process may include several process steps including a working group active step 120, a time step 125, a check status of working group step 130, a working group active step 135, and a send current issue list step 140. The business process may also include access to some form of data shown as an issue list 145.

The example business process shown in FIG. 1 may send an issue list (e.g., issue list 145) at regular time intervals if a working group is active. Otherwise, the business process ends. As shown in FIG. 1, the process sequence flows are illustrated as solid lines, message flows are illustrated as dashed lines and associations (e.g., data associations) are illustrated as dotted lines. As one skilled in the art will appreciate, the business process is more than a static data in/data out process. By contrast, messages may be input/output at varying points (e.g., states) of the process. For example in the business process shown in FIG. 1, not only is there a data output (e.g., issue list 145 is sent), but there is also a message output (e.g., outgoing message types).

Figure 2:
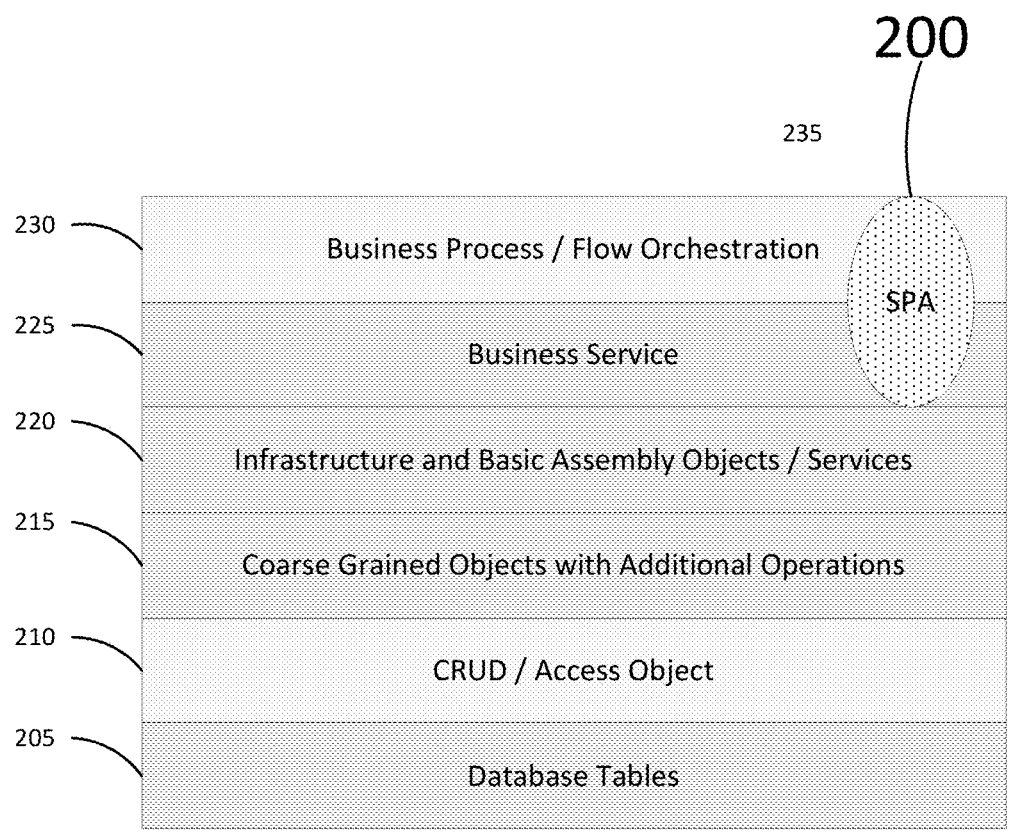
FIG. 2 illustrates an implementation of a service process architecture according to an example embodiment.

FIG. 2 illustrates an implementation of a service process architecture (SPA) according to an example embodiment. Service architectures, programming languages as well as integration frameworks in general introduce components and allow interaction and integration between components through APIs. SPA may leverage a business process approach in addition to the traditional interaction patterns. The pattern may utilize SPNs (e.g., SPN 100) as building blocks of the SPA 100. Example embodiments may utilize business process connectivity between sub-processes such that each sub-process is implemented by a business service that implements SPNs and may be orchestrated through an orchestration tool associated with BPMN or BPEL.

SPA may be an architectural structure overlaid on top of a known object-oriented programming and service oriented architecture, and would apply to the business layers of the product (e.g., program code). Example embodiments may provide modular services with greater freedom of composition. For example, modular business processes with declaration and governance of the business process as part of the modular service.

Programmer developers and architects typically approach integrations, composition and modularity from the technical and engineering angle. SPA adds on top of that a business process design where the product is directed to a business model. Example business services (unlike the "lower" technical layers of the software) therefore may describe a business process, one that exists in design time, is governed in run time and is the basis for all business integrations (through a unique process external interface/SPN interface).

As shown in FIG. 2, the implementation of a SPA includes database tables 205, create, read, update and delete (CRUD)/access object 210, coarse grained objects with additional operations 215 (e.g., validation), infrastructure and basic assembly objects/services 220, business service 225, business process/flow orchestration 230, and SPA 235.

The database tables 205, create, read, update and delete (CRUD)/access object 210, coarse grained objects with additional operations 215 (e.g., validation), infrastructure and basic assembly objects/services 220, business service 225, and business process/flow orchestration 230 are generally known to those skilled in the art. Example embodiments provide SPA 235 overlaid on the business service 225, and business process/flow orchestration 230 layers. The SPA may be configured to provide process connectivity between processes and/or sub-processes such that each process/sub-process may be implemented by a business service that implements SPNs and can be orchestrated through an orchestration tool (e.g., business process/flow orchestration 230) that understands BPMN or BPEL.

Figure 3:
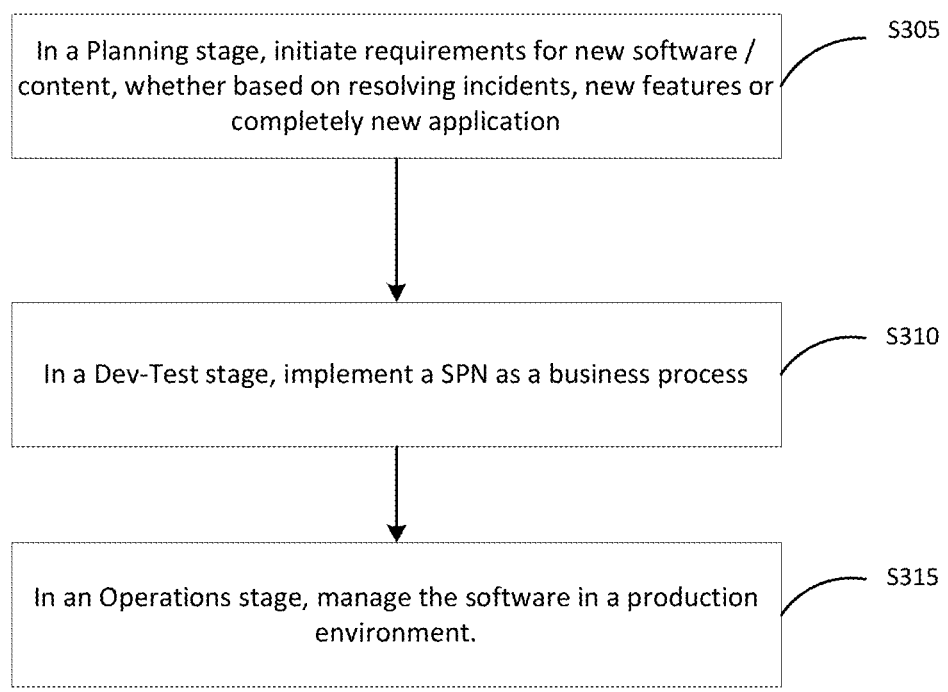
FIG. 3 illustrates an application development lifecycle method according to an example embodiment.

Example embodiments add to the orchestration tool (e.g., AO, any orchestration and/or enterprise service bus (ESB) product) a new BPM layer supporting a graphical BPMN engine. The new layer will include a studio which will allow the display of processes as well the creation of new IT management processes based on the provided catalog of SPNs. Moreover, the new layer will have a runtime governance user interface (UI) configured to enable embedding the new layer into the UI. As such, both ITSM and BRPM may be able to expose the state of the holistic process within their own UIs FIG. 3 illustrates an application development lifecycle method according to an example embodiment. For example, FIG. 3 shows the DevOps process and the stages through which SPA may enable a full application life cycle and provide a well-defined process bridging between design, implementation and operations.

As shown in FIG. 3, in step S305, in a planning stage, initiate requirements for new software/content, whether based on resolving incidents, new features or completely new applications. For example, roles (e.g., product managers) may provide (e.g., by leveraging a BPM like standard such as BPMN, BPEL, and the like) a description of the business process or changes for an existing business process. The roles may consider the demarcation of sub-processes and the interfaces between the sub-processes. The roles may emphasize modularity and loose coupling (e.g., of business processes) which may enable freedom of composition and integrations in future run-time scenarios. For example, each process/sub-process may be translated into an SPN definition with a well-defined SPN interface consisting of the incoming and outgoing events that each process/sub-process recognizes/supports.

In step S310, a development-test stage, implement a SPN as a business process. For example, roles (e.g., development and QA teams) may be code software from scratch, and/or alternatively, working with an existing product. Regardless, the roles may demarcate code based on the defined business processes/sub-processes. The roles may implement the SPN by enveloping the relevant business process/sub-process code with a governance module associated with the business process/sub-process. For example, the governance module may expose (e.g. to any SPN orchestration tool) a run-time "state" of the business process/sub-process according to a given definition and based on the BPM standard (e.g. BPMN or BPEL). The governance module may also provide (e.g., at run-time) implementation to the defined process events which the SPN supports.

In step S315, an Operations stage, manage the software in a production environment. For example, operations roles may review changes in applications before the applications have been implemented by, for example, reviewing the applications updated/new SPN(s). The operations roles may leverage a SPN orchestration software to integrate, monitor/govern and remediate software that is based on an SPN architecture.

For example, the operations roles may integrate software in a dynamic manner by combining SPN(s) through SPN interfaces in an orchestration planning UI. The operations roles may track running instances of SPN(s) by visualizing the state they reside in at any given time. The operations roles may determine if issues with the applications based on the above monitoring/governance (e.g., leading to intelligent incident management). The operations roles may devise a mechanism to resolve the problem by taking specific route in accordance to the SPN process definition. The operations roles may participate back in the planning stage (e.g., starting over again the application life cycle) where the operations roles may comment on business needs or problems with a given business process.

The following describe example embodiments through example implementations. However, the example embodiments are not limited by the aspects of any given implementation.

Figure 4:
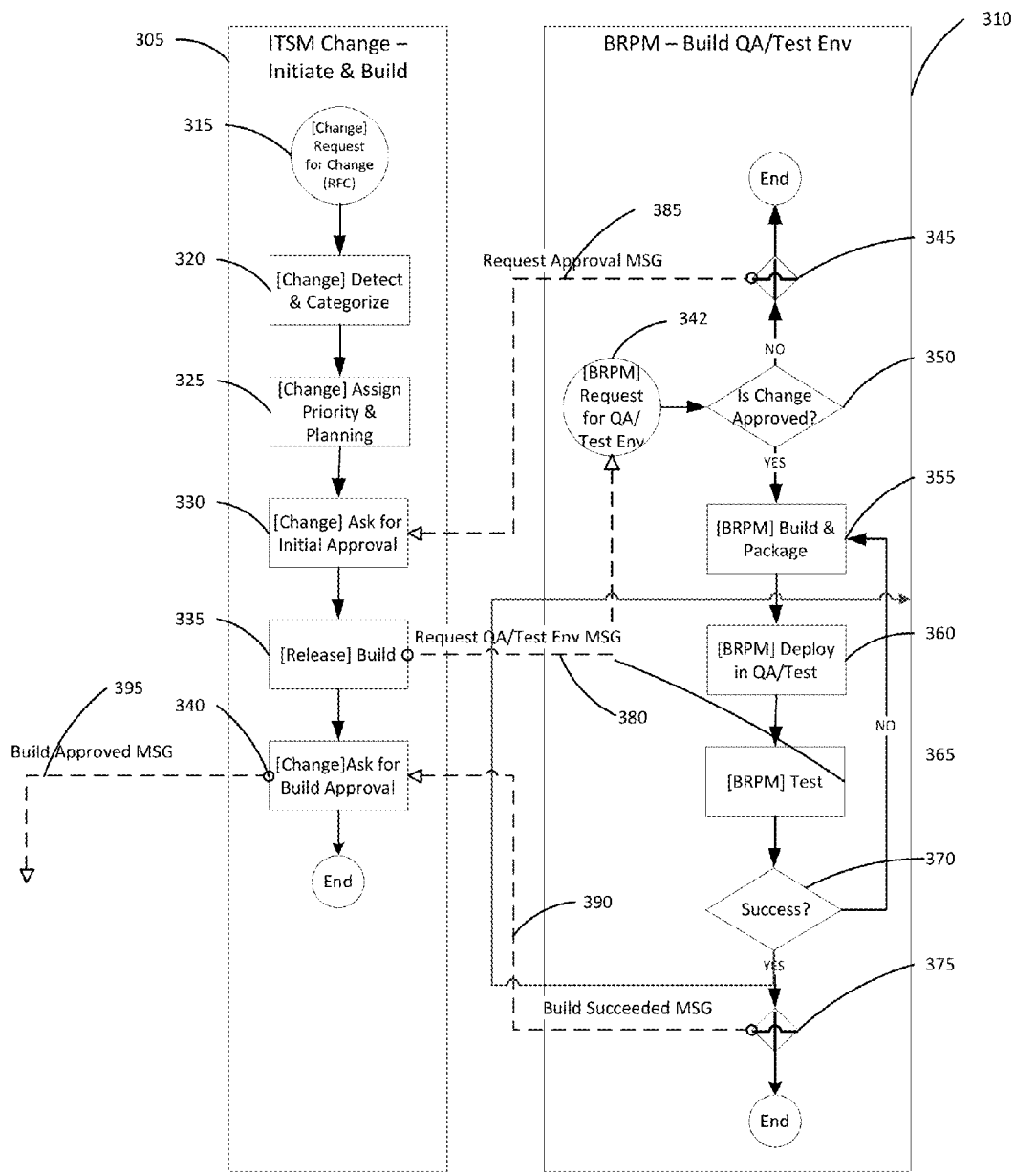
FIG. 4 illustrates an example implementation of service process nodes according to an example embodiment.

FIG. 4 illustrates an example implementation of service process nodes according to an example embodiment. As shown in FIG. 4, the process sequence flows are illustrated as solid lines, message flows are illustrated as dashed lines. FIG. 4 shows a first example embodiment through an example implementation of business processes using SPNs and SPAs. FIG. 4 illustrates ITSM integration with BRPM as an example.

ITSM integration with BRPM integrates two products from two different product lines. Those skilled in the art should see this example as an intuitive use-case, as products from different business units may be expected to remain loosely coupled. ITSM and BRPM may provide SPNs through which example embodiments may perform the release process integration between the two products. ITSM release may be constructed of a few phases (e.g., collaboration, build, test and deploy). Each of these phases may relate in some way to a BRPM process.

Example embodiments break the ITSM flow into a sub-process (e.g., SPN) in order to keep the example short. In example embodiments, the two SPNs interact and connect using messages. These message types may be declared as part of each SPN interface, denoting outbound messages as well as receptors of inbound message types (e.g., for either events or activities).

As shown in FIG. 4, ITSM change initiate and build node 405 and BRPM build QA/test environment node 410 are implemented as a set of process blocks. According to the example embodiment, with SPA both change and incident may be enveloped as SPNs and implement a connection through a set of messages, events and activities. For example, the process blocks may be converted into BPMN flows, declaring a set of messages that may formalize the proper interaction and building SPNs around the relevant code in each of ITSM change initiate and build node 405 and BRPM build QA/test environment node 410. The AO may be configured to connect the SPNs into the desired flow and executed accordingly.

The ITSM change initiate and build node 405 includes process blocks request for change (RFC) 415, detect and categorize 420, assign priority and planning 425, ask for initial approval 430, build 435, ask for build approval 440. The ITSM change initiate and build node 405 further includes a declared set of messages including request QA/test environment message 480, request approval message 485, build succeeded message 490, and build approved message 495.

Process block request for change (RFC) 415 may be configured to initiate an RFC. Process block detect and categorize 420 may be configured to determine information about the RFC and categorize the RFC based on the information. Process block assign priority and planning 425 may be configured to determine and assign a priority to the RFC based on the information and plan (e.g., determine steps and timeline) for executing the RFC. Process block ask for initial approval 430 may be configured to obtain approval (e.g. from an engineering manager) for performing the RFC. Process block build 435 may be configured to order a prototype of the product built with the change. Process block ask for build approval 440 may be configured to obtain approval (e.g. from an operations manager) for performing a build of the prototype. Each of the process blocks may include code segments that when executed by a processor cause the processor to perform as a special purpose computer configured to perform the tasks associated with the process blocks.

The BRPM build QA/test environment node 410 includes process blocks request for QA/test environment 442, gateway 445, decision block 450, build and package 455, deploy in QA/test 460, test 465, decision block 470, and gateway 475. The BRPM build QA/test environment node 410 includes a declared set of messages including request QA/test environment message 480, request approval message 485, and build succeeded message 490.

Process block request for QA/test environment 442 may be configured to initiate a QA and/or test environment. Process block gateway 445 may be configured to convert a state (e.g., change approved) to a corresponding message. Process block decision block 450 may be configured to determine whether or not a change is approved. Process block build and package 455 may be configured to build and package the prototype. Process block deploy in QA/test 460 may be configured to deploy (e.g., develop or configure) quality assurance checks and/or tests for the prototype. Process block test 465 may be configured to perform the quality assurance checks and/or tests on the prototype. Process block decision block 470 may be configured to determine if the quality assurance checks and/or tests passed for the prototype. Process block gateway 475 may be configured to convert a state (e.g., test passed) to a corresponding message. Each of the process blocks may include code segments that when executed by a processor cause the processor to perform as a special purpose computer configured to perform the tasks associated with the process blocks.

The declared set of messages including request QA/test environment message 480, request approval message 485, and build succeeded message 490. Each of the messages communicate information (e.g., state and status) between the ITSM change initiate and build node 405 and the BRPM build QA/test environment node 410. As discussed above, a typical software code block includes one input and one output instance (each potentially including several variables). The example embodiment provides interfaces for exchanging messages communicating, for example, events, states and/or activities. The interface may allow for exchanging messages at intermediate steps during the process flow. The interface may allow for exchanging messages during design-time and run-time. In the example embodiment, process blocks or steps may continue to execute while awaiting a message and/or wait in a hold until the message is received.

Figure 5A:
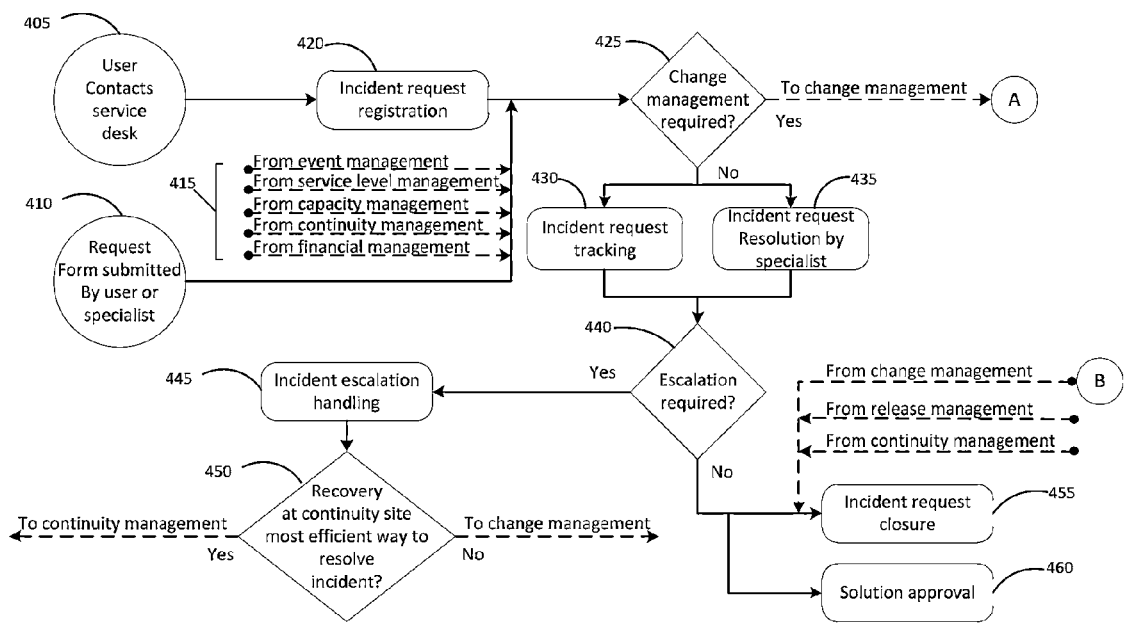
FIGS. 5A and 5B illustrate another example implementation of service process nodes according to an example embodiment.
Figure 5B:
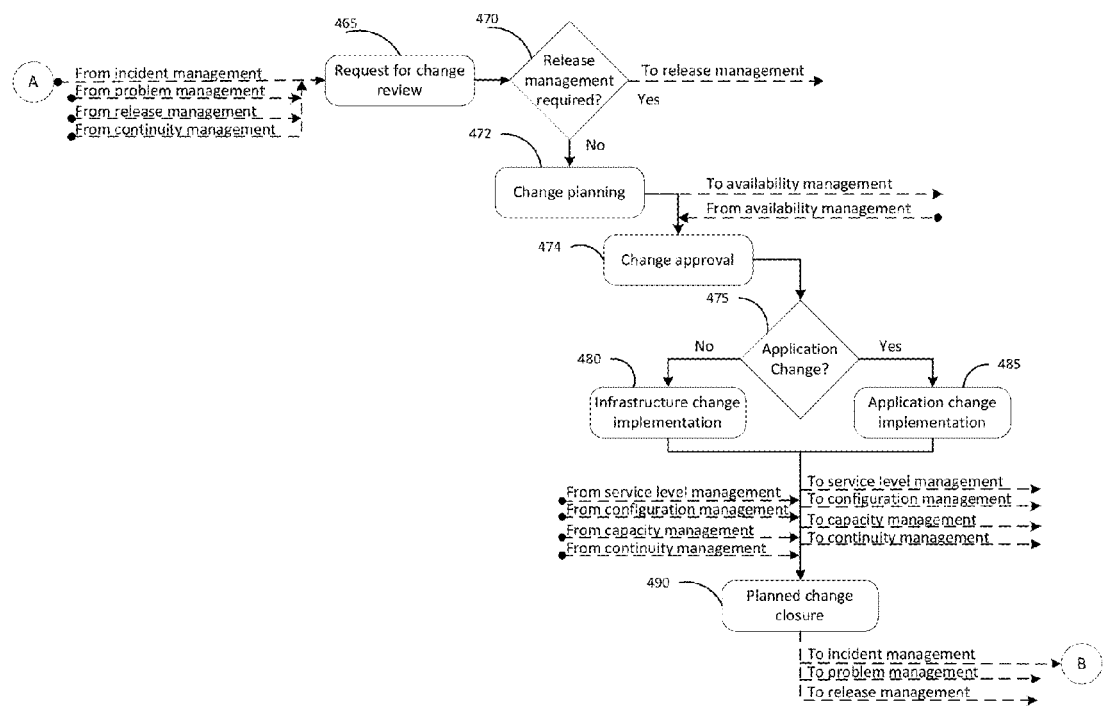

FIGS. 5A and 5B illustrate another example implementation of service process nodes according to an example embodiment. As shown in FIGS. 5A and 5B, the process sequence flows are illustrated as solid lines, message flows are illustrated as dashed lines. FIGS. 5A and 5B show a second example embodiment through an example implementation of business processes using SPNs and SPAs. FIGS. 5A and 5B illustrate ITSM change and incident management.

The example implementation illustrates the process integration of two products from the same product line (e.g., ITSM incident management (FIG. 5A) and ITSM change management (FIG. 5B)). ITSM change management and incident management are typically tightly coupled. However, there are benefits to move towards SPA instead. For example, simplifying integrations for other incident or change management tools.

As shown in FIG. 5A, ITSM incident management includes process blocks user contacts service desk 505, request form submitted by user or specialist 510, incident request registration 520, change management required decision block 525, incident request tracking 530, incident request resolution by specialist 535, escalation required decision block 540, incident escalation handling 545, recovery at continuity site most efficient way to resolve incident decision block 550, incident request closure 555, and solution approval 560. ITSM incident management includes a declared set of messages including a message from a plurality of other management process 515, messages to and from change management amongst other shown messages.

Process block user contacts service desk 505 may be configured to initiate an incident. Process block request form submitted by user or specialist 510 may be configured to capture information related to the initiated incident. Process block incident request registration 520 may be configured to register (e.g., store the information and assign an incident number) the incident with the incident management system. Process block change management required decision block 525 may be configured to determine if a product or process change is required. If no product or process change is required, processing continues to the incident request tracking 530 and request resolution by specialist 535 process blocks.

Process block incident request tracking 530 may be configured to add a marker (e.g., unique number) to the incident to track resolution of the incident. Process block incident request resolution by specialist 535 may be configured to request special skills personnel to investigate and resolve the incident. Process block escalation required decision block 540 may be configured to determine if the incident should be brought to the attention of special (e.g., management) personnel. Process block incident escalation handling 545 may be configured to notify the special personnel. Process block recovery at continuity site most efficient way to resolve incident decision block 550 may be configured to determine (e.g., by the special personnel) if resolution at the continuity site is the most efficient way to resolve the incident. Process block incident request closure 555 may be configured to close (e.g., mark as closed in the incident registry) the incident. Process block solution approval 560 may be configured to enable authorized personnel to approve the closing of the incident. Each of the process blocks may include code segments that when executed by a processor cause the processor to perform as a special purpose computer configured to perform the tasks associated with the process blocks.

As shown in FIG. 5B, ITSM change management includes process blocks request for change review 565, release management required decision block 570, change planning 572, change approval 574, application change decision block 575, infrastructure change implementation 580, application change implementation 585, and planned change closure 590. ITSM incident management includes a declared set of messages including messages to and from incident management amongst other shown messages.

Process block request for change review 565 may be configured to initiate an appropriate change review. Process block release management required decision block 570 may be configured to determine if release management (e.g., product is in a configuration control system) is required. Process block change planning 572 may be configured to plan the steps required for executing the change. Process block change approval 574 may be configured to approve the change plan. Process block application change decision block 575 may be configured to determine if there has been an application (e.g., product use or software application) change.

Process block infrastructure change implementation 580 may be configured to implement an infrastructure change. Process block application change implementation 585 may be configured to implement an application change. Process block planned change closure 590 may be configured to close the change review. Each of the process blocks may include code segments that when executed by a processor cause the processor to perform as a special purpose computer configured to perform the tasks associated with the process blocks.

The declared set of messages for both the ITSM incident management (FIG. 5A) and ITSM change management (FIG. 5B) include messages to and from each other amongst other shown messages. Each of the messages communicate information (e.g., state and status) between the ITSM incident management (FIG. 5A) and ITSM change management (FIG. 5B). For example, interface 'A' shows a message from process block change management required 525 of the ITSM incident management (FIG. 5A) to the request for change review process block 565 of the ITSM change management (FIG. 5B). Further, for example, interface 'A' shows a message from the planned change closure process block 590 of the ITSM change management (FIG. 5B) to the incident request closure process block 555 of the ITSM incident management (FIG. 5A).

As discussed above, a typical software code block includes one input and one output instance (each potentially including several variables). The example embodiment provides interfaces for exchanging messages communicating, for example, events, states and/or activities. The interface may allow for exchanging messages at intermediate steps during the process flow. The interface may allow for exchanging messages during design-time and run-time. In the example embodiment, process blocks or steps may continue to execute while awaiting a message and/or wait in a hold until the message is received.

A third example embodiment (not illustrated) exemplifies process integration of three modules within a single product. The ITSM problem management application may include three modules that define an overall problem management business process. These modules are 'Problem Investigation', 'Known Error Handling' and 'Solution Management'. On one hand, the ITSM problem management application may provide SPA that may enable governance of the ITSM problem management applications business process. The SPA may further enable process integration between itself with other applications (e.g. ITSM incident management). But on the other hand such architecture would also mean an opportunity to break its business logic into more granular SPNs. This would allow each module to be loosely coupled instead of the typical tightly coupled nature of the code. Designing the application with SPA may allow an example embodiment to deactivate components and given that the example may include SPNs defined for the 'Problem Investigation' module, creating "adaptors" to integrate other modules into the problem management process to fulfill the 'Known Error handling' and/or 'Solution management' process may be possible.

Example embodiments provide design and architect business services according to the product's intended process; break the business logic into modular services according to the process rather than other (e.g. technical) considerations; produce an interface for business services which exposes the process that they fulfill (in a standard notation, e.g. BPMN, BPEL); expose further through the interface the state of that process in run-time; plan the integration between products and services with a process orchestration tool, leveraging the new process interface; and govern the overall process in run-time leveraging the process orchestration tool as well as the process interfaces, allowing for a deep insight into the business flow. Example embodiments apply this methodology over ITSM, promote the methodology for process integration with operational product lines, as well as between ITSM products. Even consider breaking up ITSM products into more modular processes allowing for a greater freedom of composition.

Example embodiments allow Support and IT operations/DevOps/ALM groups who typically work in organization silos, the combination of processes between silos. Example embodiments allow organizations to plan process integration, between the organization's products, but also to the central ITSM process that drives BSM.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

We claim:

1. A method for managing a business process application development lifecycle, the method comprising:

initiating, in a planning stage, requirements for an initial application based on one of (1) adding new features to the initial application and (2) a new application;

defining, in the planning stage, at least two independent sub-processes associated with the initial application;

defining, in the planning stage, an interface between the at least two independent sub-processes;

translating, in the planning stage, the at least two independent sub-processes into at least one service process node (SPN) definition, the SPN definition including an SPN interface having at least one incoming event and at least one outgoing event supported by the at least two independent sub-processes;

implementing, in a development stage, at least one SPN including associated software code representing the initial application, an exposed event configured to implement an approval of the software code and a message indicating an approval status based on the event, the at least one SPN configured to orchestrate at least two release sub-processes associated with the initial application, each of the at least two release sub-processes being associated with a corresponding development role, implement business processes including at least one process step, and expose through the SPN interface state of the business processes in run-time; and managing, in an operations stage, in run-time, the software code, approved during the development stage, representing the initial application in a production environment based on a visualization of a state of an instance of the at least one SPN using a graphical representation for specifying the business processes in a business process model, wherein the software code is integrated dynamically, in the operations stage, by combining the at least one SPN through the SPN interface, tracking running instances of the at least one SPN by visualizing the state they reside in at any given time, wherein the at least one SPN encapsulates code representing an application programming interface and code representing a business object, generates the SPN interface configured to expose internal processes of the business object, and manages the state of the business processes in run-time.

2. The method of claim 1, wherein implementing the at least one SPN includes:

enveloping a business process code with a governance module associated with the business processes, wherein the governance module exposes a run-time state of the business process and implements at least one process event supported by the at least one SPN.

3. The method of claim 1, wherein managing software code includes developing a mechanism to resolve a problem with the initial application based on the SPN definition of the at least one SPN.

4. The method of claim 1, wherein managing the software code includes reviewing changes in the initial application before the changes have been implemented.

5. The method of claim 1, wherein a first sub-process of the at least two independent sub-processes is a change request process and second sub-process of the at least two independent sub-processes is a quality assurance process.

6. The method of claim 1, wherein a first sub-process of the at least two independent sub-processes is an incident reporting process and second sub-process of the at least two independent sub-processes is a change review process.

7. A non-transitory computer readable medium including code segments that when executed by a processor cause the processor to implement a service process architecture (SPA), the SPA comprising:

a business service layer;
a business process layer; and
a service process node (SPN) configured to overlay the business service layer and the business process layer and configured to use a graphical representation for specifying business processes in a business process model associated with the business service layer and the business process layer, the SPA providing a method of managing a business process application development lifecycle, the method comprising:

initiating, in a planning stage, requirements for an initial application based on one of (1) adding new features to the initial application and (2) a new application;

defining, in the planning stage, at least two independent sub-processes associated with the initial application;

defining, in the planning stage, an interface between the at least two independent sub-processes;

translating, in the planning stage, the at least two independent sub-processes into a service process node (SPN) definition, the SPN definition including an SPN interface having at least one incoming event and at least one outgoing event supported by the at least two independent sub-processes;

implementing, in a development stage, the SPN including associated software code representing the initial application, an exposed event configured to implement an approval of the software code and a message indicating an approval status based on the event, the SPN configured to orchestrate at least two release sub-processes associated with the initial application, each of the at least two release sub-processes being associated with a corresponding development role, implement the business processes including at least one process step, and expose through the SPN interface state of the business processes in run-time; and managing, in an operations stage, in run-time, the software code, approved during the development stage, representing the initial application in a production environment based on a visualization of a state of an instance of the SPN using the graphical representation for specifying the business processes in the business process model, wherein the software code is integrated dynamically, in the operations stage, by combining the SPN through the SPN interface, tracking running instances of the SPN by visualizing the state they reside in at any given time, wherein the SPN encapsulates code representing an application programming interface and code representing a business service object, generates the SPN interface configured to expose internal processes of the business service object, and manages the state of the business processes in run-time.

8. The non-transitory computer readable medium of claim 7, wherein the business service object includes a service application program interface and service code configured to implement a business service.

9. The non-transitory computer readable medium of claim 7 including a plurality of SPNs, wherein each of the SPNs are linked via at least one associated interface.

10. The non-transitory computer readable medium of claim 7, wherein the SPN interface is configured to expose the internal processes at design time and at run time.

11. The non-transitory computer readable medium of claim 7, wherein the interface is implemented in a Business Process Model and Notation (BPMN) standard.

12. The non-transitory computer readable medium of claim 7, wherein the SPN implements an information technology service management (ITSM) process.

13. The non-transitory computer readable medium of claim 7, wherein the SPN implements a business resource planning model (BRPM) process.

14. The non-transitory computer readable medium of claim 7 the service process architecture (SPA) configured to allow interaction and integration between components through at least one application program interface, wherein the SPA utilizes at least one SPN.

15. The non-transitory computer readable medium of claim 7 including the code segments that when executed by the processor cause the processor to implement a user interface configured to read a current state of the SPN via the interface during run time of the business service object.

16. The non-transitory computer readable medium of claim 7, wherein a first sub-process of the at least two independent sub-processes of the internal processes of the business service object is a change request process and second sub-process of the at least two independent sub-processes of the internal processes of the business service object is a quality assurance process.

17. The non-transitory computer readable medium of claim 7, wherein a first sub-process of the at least two independent sub-processes of the internal processes of the business service object is an incident reporting process and second sub-process of the at least two independent sub-processes of the internal processes of the business service object is a change review process.

* * * * *

UNITED STATES PATENT AND TRADEMARK OFFICE
CERTIFICATE OF CORRECTION

PATENT NO. : 9,805,319 B2
APPLICATION NO. : 13/631328
DATED : October 31, 2017
INVENTOR(S) : Beno et al.

Page 1 of 2

It is certified that error appears in the above-identified patent and that said Letters Patent is hereby corrected as shown below:

On the Title Page

In drawing, delete " 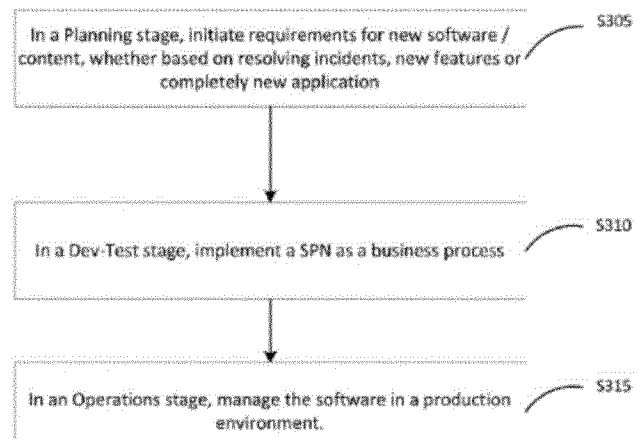 " and insert -- 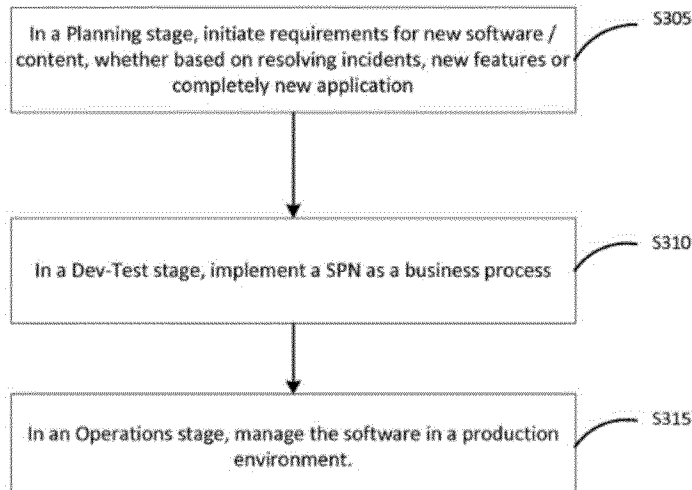 --, therefor.

Signed and Sealed this
Second Day of October, 2018

Andrei Iancu
*Director of the United States Patent and Trademark Office*

CERTIFICATE OF CORRECTION (continued)
U.S. Pat. No. 9,805,319 B2

In the Claims

In Column 12, Line 49, Claim 3, delete "managing software" and insert -- managing the software --, therefor.

In Column 14, Line 25, Claim 14, delete "7" and insert -- 7, wherein --, therefor.